Sept 10, 1957     W. B. HERNDON ET AL     2,805,628
VARIABLE CAPACITY PUMP
Original Filed April 1, 1950
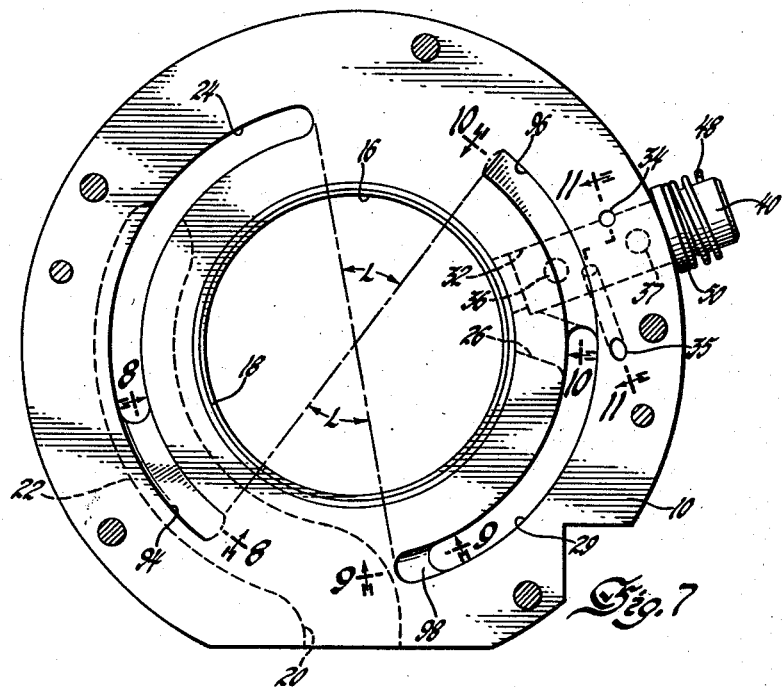
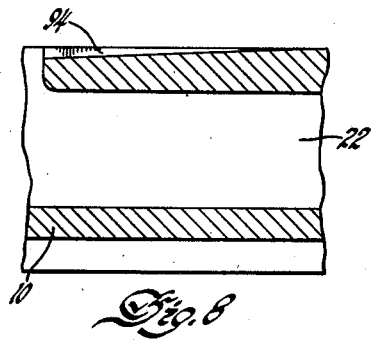
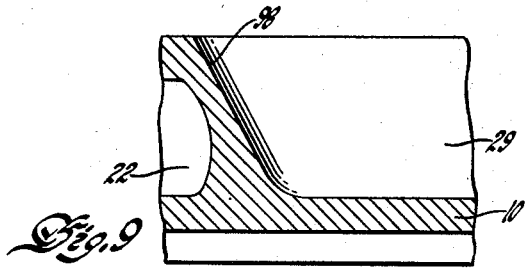
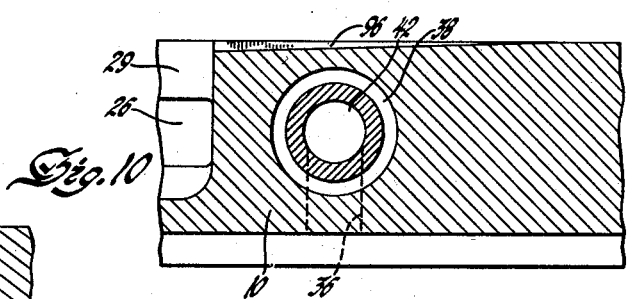
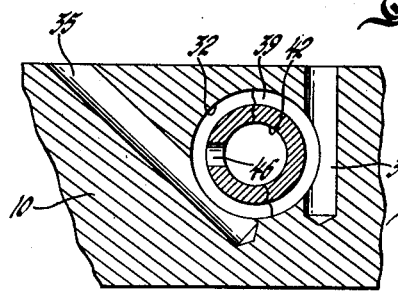
Inventors
Walter B. Herndon &
Richard L. Thoeman United States Patent Office 2,805,628
Patented Sept. 10, 1957

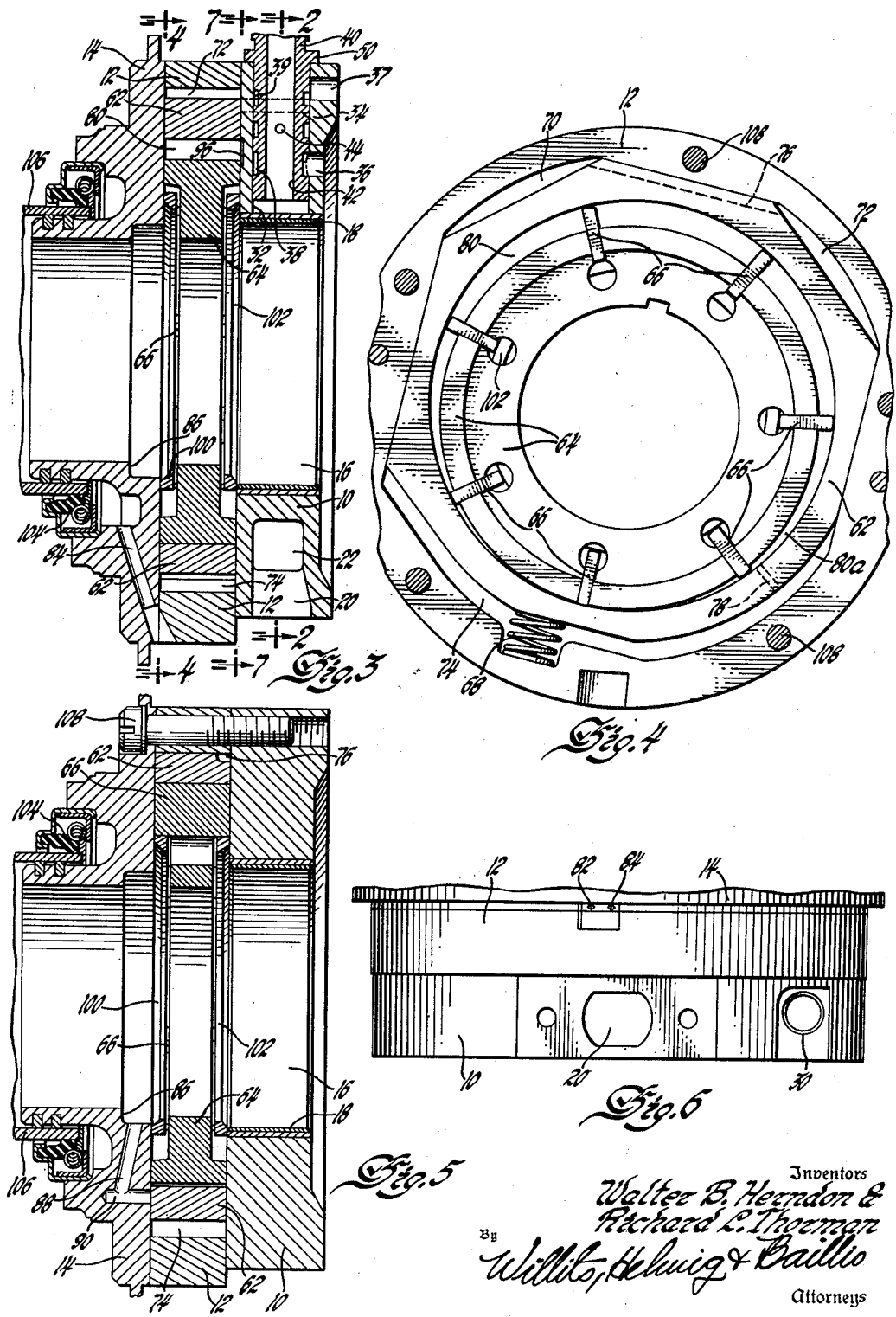

2,805,628

VARIABLE CAPACITY PUMP

Walter B. Herndon, Ann Arbor, and Richard L. Thorman, Detroit, Mich., assignors to General Motors Corporation, Detroit, Mich., a corporation of Delaware Continuation of application Serial No. 153,342, April 1, 1950. This application August 19, 1954, Serial No. 450,908

8 Claims. (Cl. 103—120)

This application is a continuation of our co-pending application Serial No. 153,342, filed April 1, 1950, entitled Variable Capacity Pump, now abandoned.

This invention relates to fluid pressure pumps adapted for use in connection with fluid pressure servo and control systems which require both automatic and manual control of output pressures. It is particularly adapted for use in conjunction with speed-ratio changing transmission mechanism having drive-determining members which are to be put into and released from operative positions by fluid pressure.

The invention more specifically involves the provision of a fluid pressure pump particularly adapted for use in conjunction with automotive vehicle transmissions, in which application the pump must be capable of prompt response to changes in demand for fluid pressure, be able to maintain constant operating pressure levels in the servo system to be supplied regardless of a wide range of speed of rotation of the pump, must use a minimum of power in supplying fluid pressure, and must be quiet in operation.

The servo supply pump hereafter set forth in detail, is of variable stroke type having a sliding ring guide member which is variably positioned radially, the position of the guide member being determined by means of differential balancing pressures derived from the action of a pressure regulating valve which may be moved to one position wherein the valve functions to tend to shift the guide member to a full stroke or maximum eccentric position, and may be moved to another position wherein the valve delivers pressure tending to shift the guide member toward a decreased stroke position. The pressure regulating valve is positioned to be responsive to pump outlet pressure and is spring loaded, the spring being calibrated to determine the pressure at which these actions occur.

The pump of this invention is made up of a plurality of sections adapted to be bolted together for ease, accuracy, and economy of manufacture. In addition, the intake and outlet passages of the pump are provided with inclined ramps, as hereafter more fully explained, which ramps greatly minimize hydraulic shock and pounding, thereby making possible a pump capable of quiet operation as is necessary in automotive vehicles.

In addition, the pressure regulator valve is constructed and arranged so as to be capable of manual control, whereby the operator of the vehicle may vary the pump output pressure as may be desired under certain conditions of vehicle operation.

Among the further advantages achieved by the pump construction are the provision of an oil pressure passage for transmission lubrication purposes controlled by the position of the guide ring and the compact arrangement of the mechanism involved.

Other and additional advantages of this invention will be apparent from the following description and claims, taken in conjunction with the accompanying drawings, in which:

Figure 3 is a sectional view of the pump rotor assembly taken along the line 3—3 of Figure 1.

Figure 4 is a sectional view taken along the line 4—4 of Figure 3 illustrating a pump assembly with the pump cover and pressure regulator valve removed.

Figure 5 is a sectional view of the pump taken along the line 5—5 of Figure 1.

Figure 6 is a bottom view of a pump with the cover partially broken away and illustrating the relationship of inlet and outlet ports in the port plate. Figure 6 is shown in a smaller scale.

Figure 7 is an elevation of the pump port plate showing the relationship of the pump inlet and outlet passages and the inclined ramps associated therewith taken along the line 7—7 of Figure 3.

Figure 8 is a sectional enlarged view taken along the line 8—8 of Figure 7.

Figure 9 is a sectional enlarged view taken along the line 9—9 of Figure 7.

Figure 10 is a sectional enlarged view taken along the line 10—10 of Figure 7 illustrating the relationship between the pressure regulator valve bore and pressure inlet passages associated therewith.

Figure 11 is a sectional enlarged view taken along the line 11—11 of Figure 7.

Referring first to Figs. 3 and 5, there is shown a variable capacity pump made up of an assembly of a port plate 10, rotor casing 12 and pump cover 14, each member being formed as a separate unit and the pump being assembled as by means of bolts 108 for simplicity, accuracy, and economy of manufacture.

Figure 1:
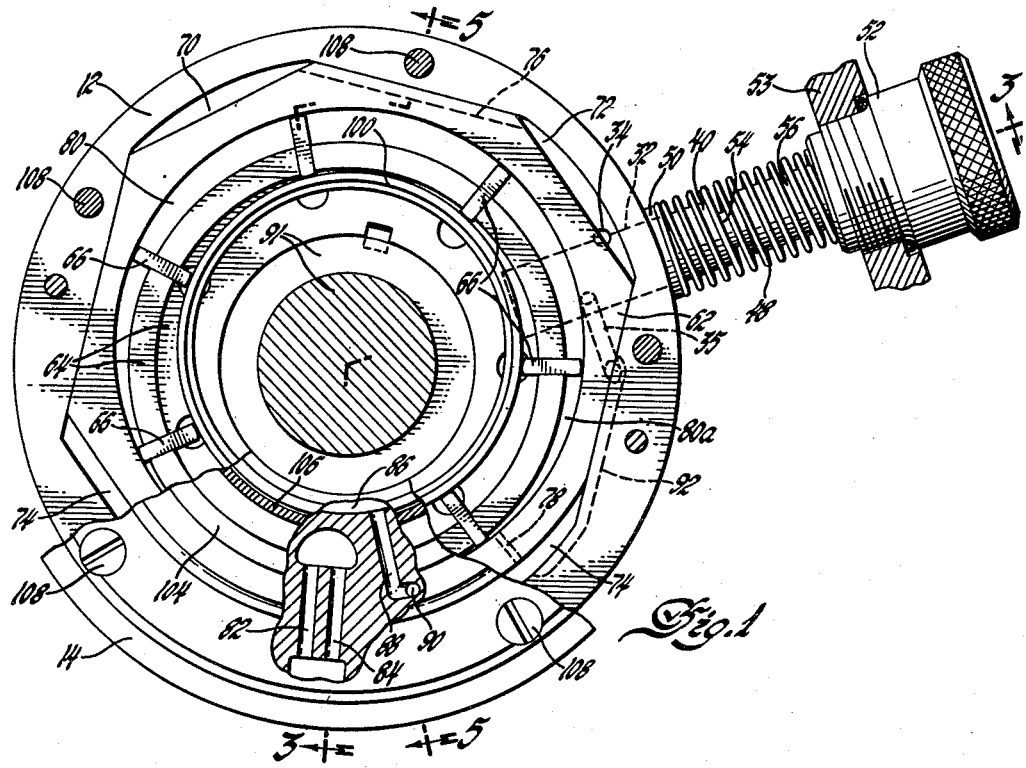
Figure 1 is an elevation, partially in section with parts broken away illustrating a pump constructed in accordance with the principles of this invention.
Figure 2:
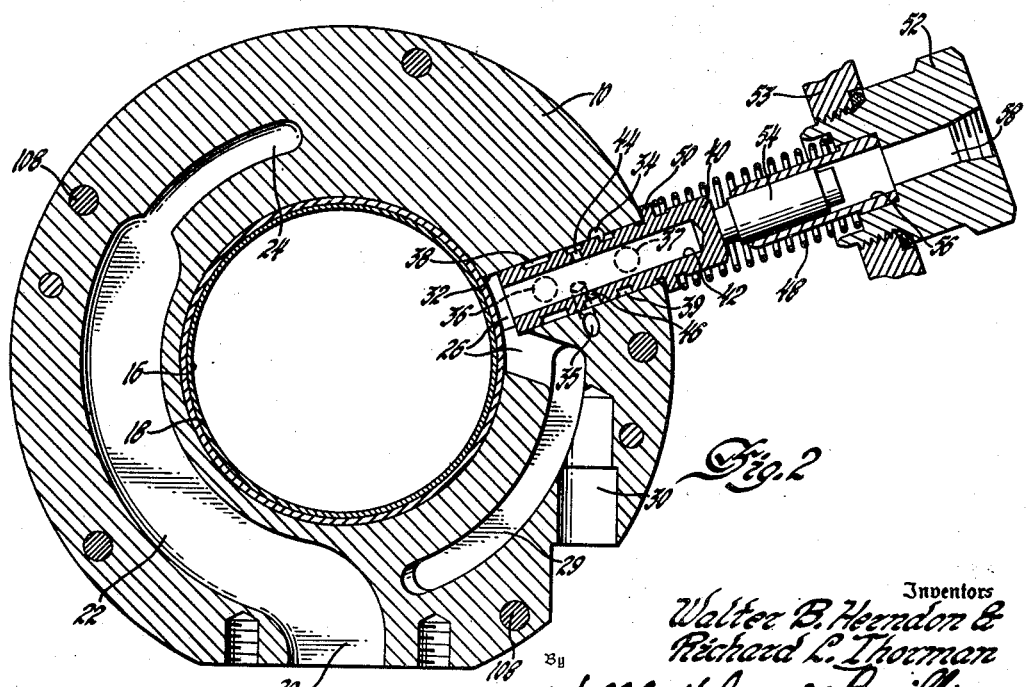
Figure 2 is a sectional view through the pump port plate taken along the line 2—2 of Figure 3.

As shown in Figures 1 and 2, port plate 10 is provided with a center bore 16 having a bushing 18 adapted to receive a drive shaft 91 for rotating a plurality of pump vanes 66. A suction or fluid inlet port 20 is formed in the valve plate, the port communicating with relatively wide and narrow passages 22 and 24 respectively. Pressure outlet port 30 communicates with a cored passage 29, formed concentric with center bore 16, which passage, in turn, communicates with passage 26. A radial bore 32 in the port plate communicating with outlet pressure passage 26 is adapted to receive a fluid pressure regulator valve 40 having an axial bore 42 opened to fluid pressure in passage 26. The regulator valve 40 is drilled transverse to bore 42 to provide fluid pressure outlet ports 44 and 46. Passages 34, 35, 36 and 37 are drilled in the port plate for a purpose hereafter more fully explained. The valve 40 includes a pair of spaced annular recesses 38, 39 for control of fluid pressure as hereafter explained in detail. The valve body is constantly urged to the position shown in Fig. 2 by means of a spring 48 cooperating with a boss or stop member 50 on the valve body. Compression of spring 48 may be calibrated by adjustment of a thumb screw 52 externally threaded and adapted to be screwed into the transmission housing 53. Manually operable means in the form of a plug 54 slidably mounted within a sleeve 56 is provided for manually modifying the action of the regulator valve so that the fluid pressure maintained by the pump may be varied. In the example shown, plug 54 acts as a piston bearing upon the valve body and, upon admission of fluid pressure to sleeve 56 through passages 58, the plug aids the spring in urging the valve to the left, as seen in Fig. 2. Fluid pressure may be admitted to plug 54 in any suitable manner, for instance, by means of suitable valving linked to the vehicle accelerator pedal and arranged to admit fluid pressure to the plug with opening movement of the accelerator pedal.

Referring to Figures 1 and 4, in Figure 1 there is shown the pump case assembly, which assembly includes an outer case 12, a capacity-varying ring or guide member 62 adapted to be variably positioned radially in the pump case, and a pump rotor 64 carrying a plurality of pump vanes 66 rotating in the ring and pump case. Modulator ring 62 includes a pair of parallel flat surfaces adapted to contact similar parallel flat surfaces formed upon the pump case so that the ring may be slid radially with respect to the case. A primer spring 68 (see Fig. 4) disposed between guide ring 62 and case 12 forces the guide ring upwardly to a maximum eccentric position with respect to the pump rotor 64 whenever the pump is not in operation. The outside of guide ring 62 is polygonal to form a pressure-receiving chamber 70—72—76 between the guide member and case at one side of rotor 64 and an additional pressure chamber 74 between the guide member and case adjacent spring 68. A port 78 (Fig. 4) is drilled through guide member 62 to provide for restricted communication between chamber 74 and pumping chamber 80a within which the pump vanes rotate. A pair of fluid pressure drain passages 82 and 84 in cover 14 provide for discharge of leakage oil from the transmission as explained in connection with the description of Figure 3. The cover member includes an annular passage 86 communicating with passages 88 and 90 to supply lubrication oil to the transmission as explained more fully in connection with Figure 5. A drive shaft 91 is keyed to rotor 64.

Referring to Figures 1 and 2, port plate 10 is provided with drilled passages 34 and 35, the first of which communicates with radial bore 32 and capacity-reducing chamber 72, the second of which communicates with radial bore 32 and a second passage 92 formed in the pump case which, in turn, communicates with capacity-increasing chamber 74 provided between the guide ring and case. The position of valve 40 in bore 32 determines the admission of fluid pressure to the aforementioned chambers.

Figure 3 is a section taken along the line 3—3 of Figure 1 showing the pressure regulator valve disposed in radial bore 32. A pair of cylindrical vane rings 100 and 102 serve to support the individual pump vanes against the ring 62 within their respective slots in the rotor member 64. Depending upon the position of valve 40 in radial bore 32, the annular grooves 38 and 39 on the valve body are placed in communication with pressure discharge passages 36 and 37, respectively, in port plate 10 to permit discharge of fluid pressure from chambers 74 and 72, respectively. Passages 36 and 37 discharge to the pump sump by means of passages not shown. Pump cover 14 is provided with an oil seal 104 designed to prevent leakage of oil from the member to which it is mounted, such as, for example, a transmission housing 106, and is provided with passages 82 and 84 (see Fig. 3) which may lead back to the pump sump for discharge of fluid which may leak past the oil seal rings. In Figure 5 the passages 88, 90 and annular groove 86 of Figure 1 are shown. Oil under pressure for lubricating purposes and to a fluid turbine drive unit may be admitted to passages 90, 88 and annular groove 86 from which groove the oil may pass through the cover 14 to the interior of the transmission associated with the pump. Admission of such lubricating oil pressure is controlled by the radial position of guide member 62 in the case 12. Under initial condition of operation, as when the vehicle is first started, guide ring 62 cuts off oil flow through passage 90 until sufficient pressure is built up in the pump chambers 72 and 70 to force guide member 62 downwardly against the action of pressure in chamber 74 and spring 68 to uncover port 90. The passages 88 and 90 are calibrated to provide limited passage of lubricating fluid so as to maintain a desired flow of the lubricating oil. For example, while the pump output pressure may be of an order of 80 pounds per square inch, lubricating oil pressure may be maintained at any desired pressure such as 20 pounds per square inch. By cuttnig off passage 90 in initial stages of pump operation, very rapid build up of pump output pressure (used to operate control servos in the transmission) may result. As shown in Figure 5, the pump assembly may be secured together by means of a plurality of bolts similar to bolt 108.

Figure 6 is an end view of the pump illustrating the stacked assembly of cover 14, casing 12, and port plate 10, together with the relative positioning of inlet port 20, outlet port 30, and drain ports 82, 84 of Figure 1, 2 and 3.

In Figure 7, the relationship of the inlet and outlet passages and the ramps associated therewith is shown. As shown, inlet port 20 communicates with a relatively wide passage 22 and a relatively narrow passage 24, with a ramp 94 formed in the port plate above the portion 22. The passage 22 below the narrow passage 24 forms a chamber of relatively large volumetric capacity to insure a constant feed of incoming fluid to the narrow passage 24 overlying passage 22. Ramp 94, passage 24 and that part of passage 22 beneath ramp 84 and narrow portion 24 are all formed concentric with the center bore 16. At the discharge side of the pump there is provided a discharge passage 29, and a pair of ramps 96 and 98 at each end of passage 29. These ramps and passage are likewise formed concentric with center bore 16. The various ramps, the passage 24 and the outlet passage 29 may be of equal width, while the concentric portion of wide passage 22 may be greater than the width of the narrow portions and the ramps. It is important to note that cut-off portion of the circumferential segment, as measured by the angle L, between the end of passage 24 and the beginning of ramp 96, as well as the cut-off portion of the circumferential segment between the end of ramps 94 and 98 is less than the circumferential segment included between pairs of vanes adjacent the passages and ramps. For example, the angle L between the end of passage 24 and the beginning of ramp 96 (which represents cut-off space on the port plate) is 48 degrees. Likewise, the angle between end of ramp 94 and the end of ramp 98 is 48 degrees. At the same time, there are provided seven equally spaced vanes, the adjacent vanes being slightly less than 51½ degrees apart. The ramps are at maximum depth at the end thereof adjacent the passages, and taper to decrease smoothly and uniformly to zero depth at the end of the ramps remote from the concentric passages.

In Figure 8, ramp 94 is shown, for example, as extending uniformly downwardly from a zero depth to a maximum depth of from forty to forty-five thousandths of an inch at the ramp end adjacent passage 22.

In Figures 9 and 10, ramps 98 and 96 are more clearly shown. In the figures, the relationship of ramps 96 and 98 to outlet passage 29 is shown. Each of these ramps tapers uniformly downwardly from the face of the port plate to a maximum depth at the end of passage 29 associated with the ramp, respectively.

In Figure 11, the relationship of bore 32 to passages 34 and 35 is more clearly shown. Port 34 is drilled transverse to radial bore 32 and communicates with chamber 72. Passage 35 connects bore 32 with passage 92.

*Operation*

When the pump is inoperative, as when shaft 91 is stationary, spring 68 moves guide member 62 to its position of maximum eccentricity with respect to the rotor, thereby assuring maximum pumping action upon the part of the pump upon initial rotation of shaft 91. At the same time, valve 40 is positioned by spring 48 such that passage 34 is in communication through recess 39 with exhaust port 37. Simultaneously, passage 42 of the valve body is placed in communication with pressure inlet passage 35 through ports 44 and 46 so that the initial pressure build up in the pump is directed to chamber 74 adjacent spring 68. This pressure, acting upon guide member 62 serves to insure maximum pump capacity and rapid build up of pump pressure. The lubrication oil feed port 90 is cut off by guide member 62 and pressure outlet port 36 for chamber 74 is cut off by valve 40.

Incoming fluid in passages 22 and 24 is sucked into chamber 80 intermediate guide member 62 and rotor 64 and trapped between adjacent pairs of the vanes as the vanes move past the end of port 24, the pressure gradually increasing to a maximum as the vanes pass through the cut-off segmental zone. As the leading vane passes over ramp 96, output pressure fills passage 29, ramp 98, passages 26, 30 and passage 42 in valve 40 building up pressure acting upon valve 40 which tends to shift the position of the valve to control admission of fluid pressure to chambers 72 and 74. When the pump capacity exceeds the demand for fluid pressure by the transmission servo mechanism operated by the fluid pressure and supplied by the pump, the discharge pressure moves the valve to admit pressure to chamber 72 and to release pressure from chamber 74 such that guide member 62 is moved radially in case 12 to reduce the pump capacity to balance pump output so that the outlet pressure corresponds to the pressure called for and controlled by calibrated spring 48 of the pressure regulator valve. In operation, pressure may be directed by the valve for quick response solely to chamber 74, or solely to chamber 72. In the normal regulating position pressure in chamber 74 is maintained constant by controlled flow from the pressure side of the pump through orifice 78 so that the position of guide member 62 in case 12 is determined by the pressure differential in the two chambers. In normal operation, therefore, there is an overlap of the inlet and outlet ports and the pressure directing ports of the valve body. It is important to note that due to the relative spacing of the end of passage 24 and the beginning of ramp 96 and the spacing of the vanes, that fluid pressure is admitted to the ramp as cut-off occurs at the end of the passage 24. Similarly, fluid is permitted to flow back down ramp 98 to passage 29 until the leading vane of any given pair of adjacent vanes has passed over the end of the ramp 94 adjacent ramp 98. Due to the relatively long arcuate distance included by the ramps and passages on the intake and discharge sides of the pump, respectively and the arrangement of the cut-off segments between intake and discharge on the one hand and discharge and intake on the other hand as being less than the spacing between any given pair of pump vanes, hydraulic shock and pounding in the pump has been greatly minimized, thus providing a pump capable of smooth, quiet operation and particularly adapted for use in connection with a hydraulically actuated transmission. It has been found by actual physical test that vane-type pumps of common construction are unsatisfactory in such an application due to the noise developed in their operation.

An additional feature of this pump is the provision of the passage 78 (see Fig. 1) drilled through guide member 62 to establish restricted fluid communication between chamber 74 and chamber 80a. This pressure passage provides a cushioning or damping action in that it minimizes pressure peaks which otherwise would occur upon initial feed of pressure to passage 74, and also upon fluctuation of the guide member in the pump case, as when the guide member seeks a position within the pump case as determined by the pressure fed to chamber 72 and 70 on the one hand and chamber 74 on the other hand. The restricted pressure passage aids to minimize hunting or fluctuation of the guide member in the pump case and contributes to smooth proper positioning of the guide member in the case. These features combine to prevent over-travel and consequent hunting of the guide member as pressures vary in the respective fluid pressure chambers. By drilling bore 32 radially in the port plate, the pressure feed and discharge passages communicating with the bore may be simple, inexpensive, straight-drilled passages. The arrangement of the pressure regulator valve with respect to the inlet and outlet passages therefore contributes the provision of a pump design particularly adapted for low-cost and ease of manufacture as is required for large scale production.

While no back plate has been shown, it will readily be understood that a back plate may be mounted adjacent the pump port plate to close off that side of the pump. Such a back plate would be supplied with exhaust openings registering with openings 36 and 37 of the port plate.

What is claimed is:

1. A rotary vane-type pump comprising in combination a port plate, a cover, and a casing intermediate said cover and port plate, an opening in said casing, a guide member positioned in said casing opening for sliding motion with respect thereto, a cylindrical opening in said guide member, a rotor positioned in said guide member opening, a drive shaft journaled in said cover and port plate for rotating said rotor, a plurality of spaced vanes carried by said rotor, opposed chambers intermediate said casing and guide member at opposite sides of said rotor, a fluid inlet passage in said port plate having an arcuate portion and an axial portion, a ramp in the arcuate portion of said inlet passage tapering from the side of the port plate adjacent said rotor and terminating at one end of said arcuate portion of said inlet passage, a fluid pressure discharge passage in said port plate having an arcuate portion and an axial portion, spaced ramps in the arcuate portion of said discharge passage, said ramps terminating at opposite ends, respectively, of the arcuate portion of said discharge passage, said ramps tapering from the side of the port plate adjacent the rotor, a bore in said port plate, passages communicating with each of said chambers and said bore, and a pressure regulator valve in said bore, a plurality of annular recesses on said valve, one of said recesses being effective in one operative position of said valve to admit pump discharge pressure to one of said chambers and another of said recesses being effective in said valve position to connect the other of said chambers to vent fluid pressure from said other control chamber to the low pressure side of said pump, said valve being movable to another operative position wherein one of said recesses admits pump discharge pressure to the other of said chambers and another of the recesses is effective to exhaust fluid pressure from said one chamber to the low pressure side of said pump.

2. A rotary vane-type pump comprising a stacked assembly including a port plate, a cover, and a casing, a guide member positioned in said casing for sliding motion with respect thereto, a cylindrical opening in said guide member, a rotor member positioned in said cylindrical opening, a drive shaft for driving said rotor member, a plurality of spaced radially extending vanes carried by said rotor, diametrically opposed chambers intermediate said guide member and casing at opposite sides of said rotor, respectively, a fluid inlet and a fluid discharge passage in said port plate, said inlet and discharge passages each having an arcuate portion, a ramp in the arcuate portion of said inlet passage tapering from the side of the port plate adjacent the rotor and terminating at one end of said arcuate portion of said inlet passage, spaced ramps in the arcuate portion of said discharge passage, said ramps tapering from the side of the port plate adjacent the rotor and terminating at opposite ends, respectively, of the arcuate portion of said discharge passage, the space between said inlet passage and one of said ramps at one side of said motor and said ramps at the other side of said rotor, respectively, being less than the space between adjacent pairs of said vanes, a bore in said port plate, fluid conducting passages communicating with said chambers, respectively, and said bore, a pressure regulator valve in said bore subject to pump discharge pressure for controlling admission of fluid pressure to said chambers to vary the position of said guide member in said casing, a pressure supply annular recess and a pair of spaced recesses on said valve body, said valve body having one operative position in said bore connecting one of said chambers to said pressure feed recess and for simultaneously connecting the other of said chambers to one of said other annular recesses for exhausting fluid pressure from the same to the pressure supply side of said pump, said valve body having a second operative position for connecting said other chamber to said pressure feed recess and for simultaneously connecting the other of said chambers to the other of said annular recesses for exhausting fluid pressure from the same to the pressure supply side of said pump, and spring means yieldably biasing said valve body to said first-mentioned position.

3. A rotary vane type pump comprising a casing having a chamber therein, a guide ring slidably positioned in said chamber, a cylindrical pumping chamber in said guide ring, a rotor member carrying a plurality of spaced radially extending vanes positioned in said pumping chamber, a port plate adjacent one end of said pumping chamber, a first inlet passage in said port plate, a second inlet passage in said port plate axially spaced from said first passage having an arcuate portion overlapping said first passage and an arcuate portion extending beyond an arcuate end of said first passage, an inclined ramp at one end of the arcuate portion of said second passage forming a channel terminating at the juncture of said passages, said ramp tapering from the side of said port plate adjacent said rotor, an arcuate shaped discharge passage in said port plate, and an inclined ramp forming a channel at each end of the arcuate portion of said discharge passage, said ramps tapering from the side of said port plate adjacent said rotor one of said ramps forming a channel of greater length and lesser depth than the channel formed by the other of said ramps.

4. A rotary vane type pump comprising a casing having a chamber therein, a guide ring slidably positioned in said chamber, a cylindrical pumping chamber in said guide ring, a rotor positioned in said pumping chamber, a plurality of radially extending vanes carried by said rotor and enclosing a circumferential segment between adjacent pairs thereof, a port plate adjacent one end of said pumping chamber, a first intake passage in said port plate, a second intake passage in said port plate axially spaced from said first passage having a portion thereof overlapping said first passage and a portion thereof extending beyond an arcuate end of said first passage, an inclined ramp tapering from the side of said port plate adjacent said rotor at an arcuate end of said second passage forming a channel terminating at the juncture of said passages, an arcuate shaped discharge passage in said port plate, inclined ramps tapering from the side of said port plate adjacent said rotor forming a channel at each end of the arcuate portion of said discharge passage, one of said ramps forming a channel of greater length and lesser depth than the channel formed by the other of said ramps, and a cut-off segment on said port plate at opposite sides thereof, respectively, the circumferential cut-off segments between adjacent vanes of said rotor being greater than the cut-off segments of said port plate.

5. A rotary vane type pump comprising a casing having a chamber therein, a guide ring slidably positioned in said chamber, a cylindrical pumping chamber in said guide ring, a rotor positioned in said pumping chamber, a plurality of radially disposed vanes carried by said rotor and enclosing a circumferential segment between adjacent pairs thereof, a port plate adjacent one end of said pumping chamber, an intake passage in said port plate, a second intake passage in said port plate axially spaced from said first-mentioned passage having a portion thereof overlapping said first-mentioned passage and a portion thereof extending beyond an arcuate end of said first-mentioned passage, said passages being in communication with each other, an inclined ramp in said port plate at an arcuate end of said second passage, said ramp tapering from the side of said port plate adjacent said rotor and being flush with the face of said port plate at an arcuate end thereof and of maximum depth at the juncture of said intake passages, an arcuate shaped pressure discharge passage in said port plate, and a ramp at each end of the arcuate portion of said discharge passage, said ramps tapering from the side of said port plate adjacent said rotor, each of said ramps being flush with the surface of said port plate at one end thereof and of maximum depth at their termination adjacent said discharge passage, said port plate presenting a fluid flow cut-off segment between the adjacent ends of said passages at opposite sides of said rotor, the circumferential cut-off segments of said port plate being less than the circumferential segment included between adjacent vanes of said rotor.

6. A rotary vane type pump comprising a casing having a chamber therein, a guide ring slidably positioned in said chamber, a pumping chamber in said guide ring, a rotor disposed in said pumping chamber, a plurality of radially extending vanes carried by said rotor, a port plate adjacent one end of said pumping chamber, an intake passage in said port plate, a second intake passage in said port plate axially spaced from said first passage having a portion thereof overlapping said first passage and an arcuate portion extending beyond an arcuate end of said first passage, said first passage having a greater volumetric capacity than said second passage and said passages being in communication with each other, an inclined ramp in said port plate tapering from the side of the port plate adjacent said rotor at an arcuate end of said second passage, said ramp being flush with the face of said port plate at one end thereof and forming an arcuate shaped channel terminating at the juncture of said passages, an arcuate shaped pressure discharge passage in said port plate, a pair of inclined ramps formed in the said port plate, said ramps tapering from the side of the port plate adjacent said rotor, each of said ramps being flush with the surface of said port plate at one end thereof and of maximum depth at their juncture with said pressure discharge port, one of said ramps being of substantially greater length than the other of said ramps and the shorter of said ramps being of substantially greater depth than the larger ramp, and a fluid cut-off segment on said port plate at opposite sides of said rotor, the adjacent vanes of said rotor including a circumferential segment therebetween, said circumferential segments being of greater length than said cut-off segments.

7. A rotary vane type pump comprising a casing having a chamber therein, a guide ring slidably positioned in said chamber, a pumping chamber in said guide ring, a rotor disposed in said pumping chamber, a plurality of radially extending vanes carried by said rotor, diametrically opposed control chambers intermediate said guide ring and casing at opposite sides of said rotor, a port plate adjacent one end of said pumping chamber, an intake passage in said port plate, a second intake passage in said port plate axially spaced from said first passage having a portion overlapping said first passage and an arcuate portion extending beyond an arcuate end of said first passage, the volumetric capacity of said first passage being greater than that of said second passage and said passages communicating with each other, an inclined ramp in said port plate tapering from the side of said port plate adjacent said rotor at an arcuate end of said second passage, said ramp being flush with the face of said port plate at one end thereof and providing an arcuate shaped channel terminating at the juncture of said passages, an arcuate shaped pressure discharge passage in said port plate, a pair of inclined ramps being flush with the surface of said port plate at one end thereof and forming a channel of maximum depth at their juncture with said pressure discharge passage, said ramps tapering from the side of said port plate adjacent said rotor, one of said ramps being of greater length than the other of said ramps and the shorter of said ramps being of greater depth than the larger ramp, a radial bore in said port plate, a passage connecting said bore to said pressure discharge passage, passages connecting each of said control chambers to said bore, a pair of exhaust ports communicating with said bore, a valve body subject to pump discharge pressure slidably positioned in said casing, said valve body being effective in a first position to connect one of said control chambers to said pressure discharge passage and to simultaneously connect the other of said control chambers to one of said exhaust ports to exhaust fluid pressure from said other control chamber to the low pressure side of said pump, said valve body being effective in a second position to block off both of said control passages from said bore, said valve body being effective in a third position to connect said one control chamber to the other of said exhaust ports to exhaust fluid pressure from said one control chamber to the low pressure side of said pump and to connect said other control chamber to said pressure discharge passage, and a spring yieldably biasing said valve body in opposition to pump discharge pressure to said first-mentioned position when said pump is not in operation.

8. A rotary vane type pump comprising a stacked assembly including a port plate, a casing, and a cover, a guide member position in said casing for sliding motion with respect thereto, a cylindrical opening in said guide member, a rotor member positioned within said opening, a drive shaft for driving said rotor member, a plurality of spaced radially extending vanes carried by said rotor, diametrically opposed control chambers intermediate said guide member and said casing at opposite sides of said rotor, respectively, a cylindrical opening in said port plate adapted to receive said drive shaft, a cylindrical bushing disposed in said last-mentioned opening intermediate said drive shaft and port plate, a radially extending bore in said port plate adapted to receive a valve body, said bushing extending laterally across one end of said bore to close the same, a suction passage in said port plate having an arcuate portion, a second arcuate suction passage in said port plate axially offset from said first-mentioned suction passage communicating therewith and having a portion overlapping said first suction passage and a portion thereof extending beyond an arcuate end of said first-mentioned suction passage, an inclined arcuate shaped ramp in said port plate at an arcuate end of said laterally offset suction passage, said ramp tapering from the side of said port plate adjacent said rotor, said ramp being flush with the face of said port plate at one end thereof and of maximum depth at the juncture of said intake passages, an arcuate shaped discharge passage in said port plate, an inclined arcuate shaped ramp at each arcuate end of said discharge passage, said ramps tapering from the side of said port plate adjacent said rotor, each of said ramps being flush with the surface of said port at one end of the ramp and of maximum depth at their termination adjacent said discharge passage, one of said ramps being of greater length and lesser depth than the other of said ramps, a second discharge passage in said port plate communicating with said first-mentioned discharge passage, a passage in said port plate for admitting pump discharge pressure to said radially extending bore, a passage in said port plate communicating with said bore and one of said pressure control chambers, an inclined passage in said port plate having one end thereof terminating at said bore and the other end terminating at the surface of said port plate, a passage in said casing communicating with the other of said pressure control chambers and with one end of said inclined passage, a valve body slidably disposed in said bore, an axial passage in said valve body open at one end thereof to pump discharge pressure, an annular recess on said valve body, a transverse passage in said valve body communicating with said recess and said axial passage, a second annular recess on said valve body spaced laterally from said first-mentioned recess at one side thereof, a third annular recess on said valve body spaced laterally from said first-mentioned recess at the other side thereof, a pair of spaced exhaust ports in said port plate, said valve body being effective in one position to admit pump discharge pressure to one of said pressure control chambers and to simultaneously connect the other of said pressure control chambers to one of said exhaust ports to exhaust fluid pressure from said other control chamber to the low pressure side of said pump, said valve body being effective in a second position to block off both of said pressure control chambers from said pressure discharge passage and from both of said exhaust ports, said valve body being effective in a third position to connect said one control chamber to the other of said exhaust ports to exhaust fluid pressure from said one control chamber to the low pressure side of said pump and to connect the other of said control chambers to said pump pressure discharge passage, a spring for yieldably biasing said valve body to said first position, and a piston head on one end of said valve body closing off one end of said valve body, said valve body being movable in said bore in response to fluctuation in pump discharge pressure to successively assume the three afore-stated positions.

References Cited in the file of this patent

UNITED STATES PATENTS

| | | |
|---|---|---|
| 1,777,851 | Kuhn | Oct. 7, 1930 |
| 2,033,218 | Yirava | Mar. 10, 1936 |
| 2,062,310 | Hittell | Dec. 1, 1936 |
| 2,313,246 | Kendrick et al. | Mar. 9, 1943 |
| 2,335,284 | Kendrick | Nov. 30, 1943 |
| 2,460,047 | Von Wangenheim | Jan. 25, 1949 |
| 2,588,430 | Svenson | Mar. 11, 1952 |
| 2,600,632 | French | June 17, 1952 |
| 2,600,633 | French | June 17, 1952 |
| 2,678,607 | Hufferd et al. | May 18, 1954 |